United States Patent [19]

Joyama

[11] Patent Number: 4,819,331
[45] Date of Patent: Apr. 11, 1989

[54] APPARATUS FOR CRACKING THE HUSKS OF NUTS

[75] Inventor: Norio Joyama, Kawasaki, Japan

[73] Assignee: Meiji Seika Kaisha, Ltd., Tokyo, Japan

[21] Appl. No.: 117,582

[22] Filed: Nov. 6, 1987

[30] Foreign Application Priority Data

Nov. 11, 1986 [JP] Japan .............. 61-171960[U]

[51] Int. Cl.⁴ ................................ A23N 5/00
[52] U.S. Cl. ........................... 30/120.2; 99/574; 99/577; 99/579; 241/198 A; 241/242
[58] Field of Search ............... 30/120.1, 120.2, 120.3, 30/120.4, 120.5; 99/574, 577, 579, 581; 241/198 A, 242

[56] References Cited

U.S. PATENT DOCUMENTS

| | | | |
|---|---|---|---|
| 1,460,004 | 6/1923 | Warren | 99/577 X |
| 1,834,347 | 12/1931 | Nixon | 99/581 X |
| 1,975,761 | 10/1934 | Bailey | 99/579 X |
| 2,481,201 | 9/1949 | Collier | 99/581 |
| 4,614,033 | 9/1986 | Morris | 30/120.2 |

Primary Examiner—Frank T. Yost
Assistant Examiner—Michael D. Folkerts
Attorney, Agent, or Firm—Armstrong, Nikaido, Marmlestein & Kubovcik

[57] ABSTRACT

Disclosed is an apparatus for cracking the husks of nuts comprising a cylindrical rotor having a plurality of cracking projections on its circumference, a semicircular suspension stator having a plurality of cracking projections on its inner surface, the stator being positioned against a corresponding sector of the cylindrical rotor with a downward decreasing gap left between the stator and the rotor, and a hopper with an opening at the bottom for dispensing nuts to the gap between the stator and the rotor. The nutcracker according to the present invention permits simultaneous cracking of nuts of different sizes at an increased efficiency.

7 Claims, 3 Drawing Sheets

APPARATUS FOR CRACKING THE HUSKS OF NUTS

BACKGROUND OF THE INVENTION

1. Field of the Invention

The present invention relates to an apparatus for cracking the husks of nuts, particularly the husks of macadamia nuts without breaking their shells.

2. Description of the Related Arts

FIG. 7 shows a conventional apparatus for cracking the husks of nuts as comprising a cylindrical rotor 1 having a plurality of blades 2 projected on its circumference and a guide trough 3 positioned above the cylindrical rotor 1 with its open side against the cylindrical rotor 1. The cylindrical rotor 1 and the overlying trough 3 are parallel to each other, and they are somewhat inclined with respect to the horizontal. In operation the cylindrical rotor 1 is rotated, and then nuts 4 are put in the inclined space between the guide trough 3 and the cylindrical rotor 1 so that their husks 5 are cracked by the blades of the rotating cylinder 1 while descending in the inclined space.

Such conventional nutcracker cannot crack nuts of different sizes simultaneously. Also, disadvantageously it cannot crack a lot of nuts at one time, since nuts are travelling in a single line in the inclined space between the trough and the cylinder.

SUMMARY OF THE INVENTION

One object of the present invention is to provide an apparatus for cracking the husks of nuts of different sizes at an increased efficiency.

To attain this object according to the present invention, an apparatus for cracking the husks of nuts comprises a casing, a cylindrical rotor having a plurality of cracking projections on its circumference, the cylindrical rotor being rotatably and horizontally fixed to the casing; a semicircular suspension stator having a plurality of cracking projections on its inner surface, the stator being positioned against a corresponding sector of the cylindrical rotor with a downward decreasing gap left between the stator and the rotor, and being suspended from the casing with resilient means; and a hopper with an opening at the bottom for dispensing nuts to the gap between the stator and the rotor.

According to a preferred embodiment of the present invention, the semicircular stator is composed of upper and lower sectors connected to each other by hinge means, and the end of the upper sector is link-connected to the casing, whereas the end of the lower sector is connected to the casing with a spring equipped with elastic strength controlling means. The hinged joint of the sectors is connected to the casing with a spring equipped with elastic strength controlling means, too.

In operation nuts are thrown in the hopper, and then the nuts are dispensed to the space between the cylindrical rotor and the semicircular suspension stator. While the nuts descend in the space, the husks of the nuts are cracked by the counter projections of the rotating cylinder and the suspension stator, and the husks and the nuts with shells are discharged.

When nuts of different sizes are put in the hopper, the space between the cylindrical rotor and the semicircular suspension stator is automatically adjusted; when nuts of large sizes are conveyed in the space, the suspension stator yieldingly withdraws to increase the space whereas when nuts of small sizes are conveyed in the space, the suspension stator advances to reduce the space to pinch the nuts between the cylinder and the suspension sector.

The space between the cylinder and the suspension sector becomes gradually narrow towards its lower end, so that nuts of small sizes may be cracked somewhere in the convergent space while descending. The shell of the nut is harder than the husk of the nut. Therefore, the elastic strength of the spring can be adjusted to permit the suspension stator to apply to nuts a force which is sufficient to crack their husks, but insufficient to crack their shells.

Other objects and advantages of the present invention will be understood from the following description of preferred embodiments of the present invention, which are shown in the accompanying drawings:

PREFERRED EMBODIMENT OF THE INVENTION

Figure 1:
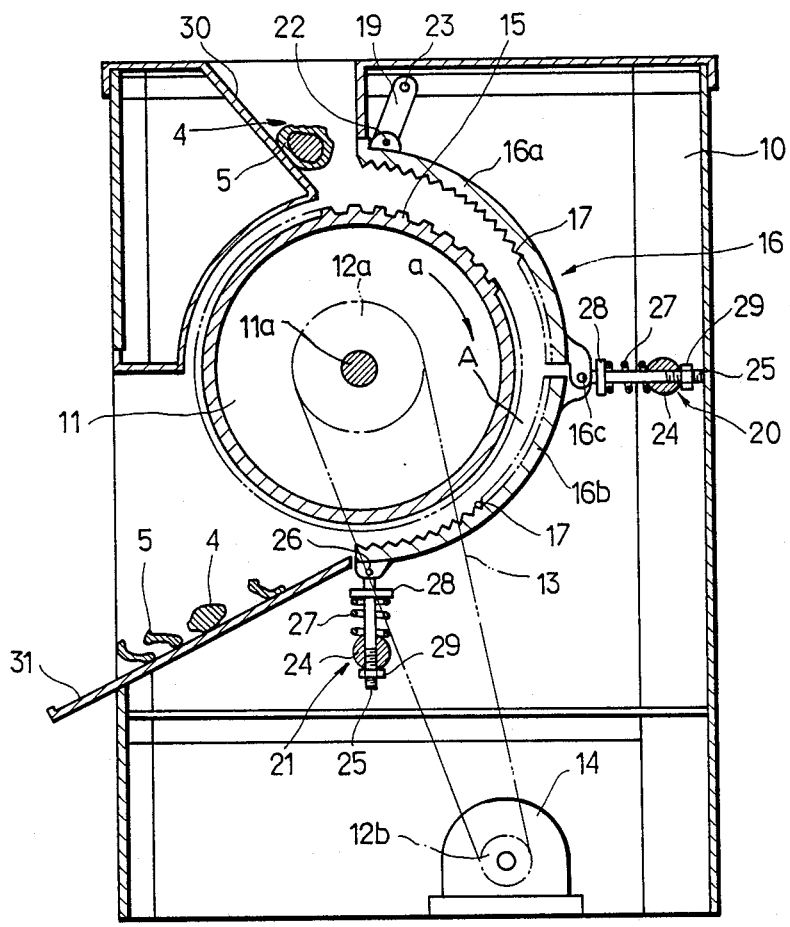
FIG. 1 shows, in section, an apparatus for cracking the husks of nuts according to a preferred embodiment of the present invention.
Figure 2:
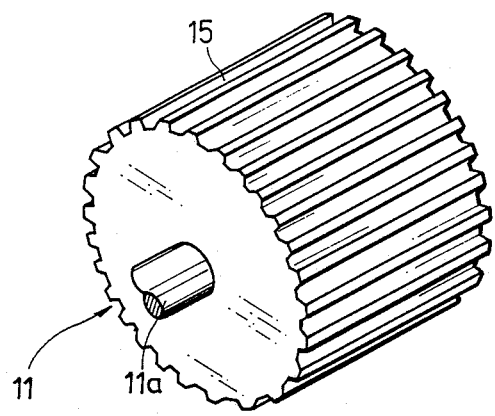
FIG. 2 is a perspective view of a cylindrical rotor used in a nutcracker according to the present invention.

Referring to FIGS. 1 to 6, an apparatus for cracking the husks of nuts according to preferred embodiment of the present invention is shown as comprising a casing 10, a motor-driven cylindrical rotor 11, a semicircular suspension stator 16 and a hopper 30. The cylindrical rotor 11 is rotatably and horizontally fixed by its axle 11a to the casing 10. The axle of the rotor has a pulley 12a, and an electric motor 14 has a pulley 12b. A belt 13 passes over the grooved edges of these pulleys 12a and 12b for rotating the rotor 11. As shown in FIG. 2, the rotor 11 has a plurality of flat-topped projections 15 extending along parallel generatrix lines.

Figure 3:
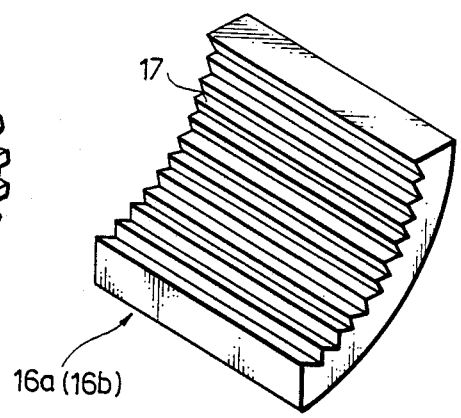
FIG. 3 is a perspective view of a stator sector used in a nutcracker according to the present invention.

The semicircular suspension stator 16 is positioned against a corresponding sector of the cylindrical rotor 11 with a downward decreasing gap A left between the stator and the rotor, and is resiliently suspended from the casing 10. Specifically, the semicircular stator 16 is composed of upper and ower quadrant sectors 16a and 16b connected to each other by hinge 16c. The end of the upper sector 16a is connected to the casing 10 by link 19, whereas the end of the lower sector and the hinged joint of the upper and lower sectors are connected to the casing 10 with resilient supports 20 and 21. As shown in FIG. 3, the stator sector has a plurality of triangular prism projections 17 extending along parallel generatrix lines on its inside surface. It should be noted that the stator sector 16 is positioned against the rotor 11 so that the gap A between the sector and the rotor may decrease downwards.

As shown in FIG. 1, the lower end of the link 19 is connected to the back of the upper quadrant sector 16a with a pin 22, and the upper end of the link 19 is rotatably connected to the casing 10 with a pin 23. Also, the resilient support 20 is used to connect the hinge joint of the upper and lower quadrand sectors 16a and 16b to the casing 10, whereas the resilient support 21 is used to connect the back of the lower quadrant sector to the casing 10. Specifically, each resilient means comprises a flanged rod having a spring 27 around its shank and a nut 29 threadedly engaged with one end of the shank opposite to the other end of the shank at which the flange 28 is fixed. As shown, resilient means 20 is fixed to the casing 10 by inserting its shank in the hole of a stud post 24 projecting from the inside surface of the casing 10 and pinching the stud post 24 between the spring 27 and the adjusting nut 29, and is rotatably fixed to the upper and lower quadrant joint with a pin 16c. Another resilient means 21 is, likewise, connected to the casing 10 and the back of the lower quadrant sector 16b. With this arrangement the space A between the rotor 11 and the sector 16 can be adjusted by means of adjusting nuts 29. Assume that a force which is stronger than the elastic strength of the spring 27 is applied to the inside surface of the suspension sector, the spring 27 is contracted, thereby allowing the stator sector to yieldingly withdraw.

A hopper 30 is fixed to the casing 10 with its opening at the bottom directed to the top end of the gap A between the stator 16 and the rotor 11. A chute 31 is positioned downstream of the bottom end of the gap A for conveying cracked nuts.

Figure 4:
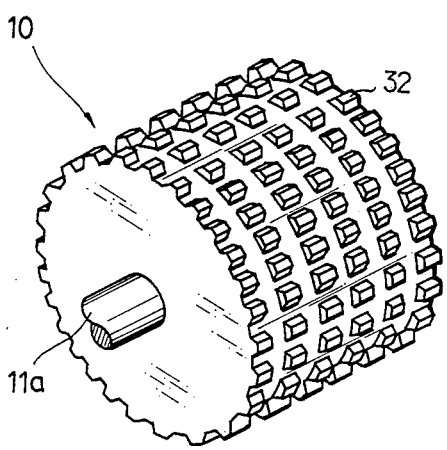
FIG. 4 is a perspective view of another cylindrical rotor used in a nutcracker according to the present invention.
Figure 5:
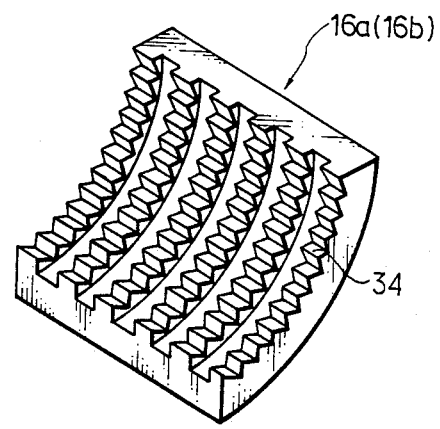
FIG. 5 is a perspective view of another stator sector used in a nutcracker according to the present invention.

The cylindrical rotor 11 has flat-topped projections on its circumference, and the semicircular suspension stator 16 has triangular prism projections on its inner surface. As shown in FIG. 2, elongated flat-topped projections 15 may be arranged in parallel generatrix lines on the cylindrical rotor 11, and in FIG. 3 elongated triangular prism projections 17 may be arranged in parallel generatrix lines on the inner surface of the semicircular suspension stator 16a or 16b. Alternatively, as shown in FIG. 4, discrete flat-topped projections 32 may be arranged in parallel circumferential lines on the cylindrical rotor 11, and discrete triangular prism projections 34 may be arranged in parallel arc lines on the inner surface of the semicircular suspension stator 16a or 16b. In place of the electric motor 14, a wheel may be fixed to the axle of the rotor 11 for manual drive.

In operation the rotor 11 is rotated in the direction as indicated by arrow a in FIG. 1, and nuts 4 are thrown into the hopper 30. Then, the nuts 4 are pulled into the gap A by the rotating rotor 11 so that their husks are cracked by the counter projections 15 and 17 of the rotor 11 and stator 16.

Figure 6:
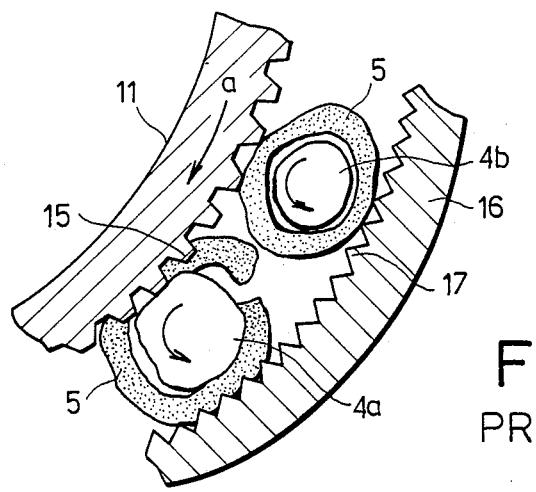
FIG. 6 shows how nuts are cracked by the cylindrical rotor and the sector stator.
Figure 7:
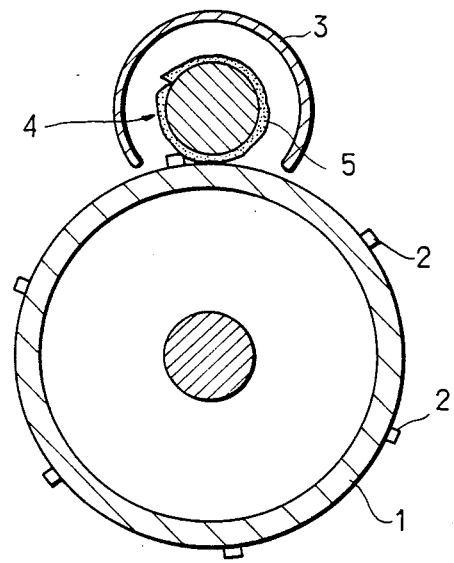
FIG. 7 shows, in section, a conventional nutcracker.

When nuts of different sizes are thrown into the hopper 30, the suspension sector 16 is yieldingly withdrawn to allow a nut of relatively large size 4a to enter the widened gap, cracking it first, and then the suspension sector 16 advances to crack a nut of relatively small size 4b, as shown in FIG. 6. All nuts of different sizes are cracked one after another while descending in the downward convergent gap A, and cracked nuts are discharged to the chute 31.

As may be understood from the above, a nutcracker according to the present invention permits simultaneous cracking of nuts of different sizes at an increased efficiency.

I claim:

1. An apparatus for cracking the husks of nuts comprising: a casing, a cylindrical rotor having a plurality of cracking projections on its circumference, the cylindrical rotor being rotatably and horizontally fixed to the casing; a semicircular suspension stator having a plurality of cracking projections on its inner surface, the stator being positioned against a corresponding sector of the cylindrical rotor with said cracking projections on said stator facing said rotor and with a downwardly decreasing gap between the stator and the rotor, and being suspended from the casing with resilient means; and a hopper with an opening at the bottom for dispensing nuts to the gap between the stator and the rotor, said semicircular stator being composed of upper and lower sectors connected to each other at one of their ends by hinge means, the other end of the upper sector being link-connected to the casing, and the other end of the lower sector being connected to the casing with resilient means, and said hinge means connecting said sectors being further connected to said casing with resilient means.

2. An apparatus for cracking the husks of nuts, as claimed in claim 1 wherein the resilient means comprises a spring equipped with elastic strength controlling means.

3. An apparatus for cracking the husks of nuts as claimed in claim 2 wherein it further comprises a chute positioned downstream of the gap for conveying cracked nuts.

4. An apparatus for cracking the husks of nuts as claimed in claim 2 wherein the cylindrical rotor has flat-topped projections on its circumference, whereas the semicircular suspension stator has triangular prism projections on its inner surface.

5. An apparatus for cracking the husks of nuts as claimed in claim 4 wherein discrete flat-topped projections are arranged in parallel circumferential lines on the cylindrical rotor, whereas discrete triangular prism projections are arranged in parallel arc lines on the inner surface of the semicircular suspension stator.

6. An apparatus for cracking the husks of nuts as claimed in claim 4 wherein elongated flat-topped projections are arranged in parallel generatrix lines on the cylindrical rotor, whereas elongated triangular prism projections are arranged in parallel generatrix lines on the inner surface of the semicircular suspension stator.

7. An apparatus for cracking the husks of nuts as claimed in claim 1 wherein it further comprises an electric motor connected to the cylindrical rotor.

* * * * *